UNITED STATES PATENT OFFICE.

NIELS D. NIELSEN, OF ELYRIA, OHIO.

CARBURIZING MATERIALS.

1,405,553.  Specification of Letters Patent.  Patented Feb. 7, 1922.

No Drawing.  Application filed June 14, 1919. Serial No. 304,151.

*To all whom it may concern:*

Be it known that I, NIELS D. NIELSEN, a citizen of the United States, residing at Elyria, in the county of Lorain and State of Ohio, have invented certain new and useful Improvements in Carburizing Materials; and I do hereby declare the following to be a full, clear, and exact description of the invention, such as will enable others skilled in the art to which it appertains to make and use the same.

This invention relates to carburizing materials, such as are used in hardening steel.

It is well known that steel is hardened by "soaking" at about 1800° F. in bone meal compound, etc., to cause it to take up carbon and the steel in then quenched. Bone meal and similar vegetable or animal mixture at present used for hardening steel is combustible to an unsatisfactory degree, and the amount of carbon absorbed is relatively low, as compared to the amount burned up by contact with the air.

I have produced a new hardening material, which has decidedly advantageous properties, as compared to materials heretofore used. I form this novel hardening material by grinding fish scales into powder, the degree of fineness being more or less immaterial. I embed the iron, steel or other metal therein, and then heat to the desired temperature, to cause the metal to absorb the carbon from the powdered scale. When the desired amount of absorption has taken place, the metal is quenched in water or other liquid to suddenly lower the temperature to harden it.

Fish scales are of peculiar composition, differing greatly from any other material. The scales are composed of about 80% collogen and 20% icthylepidin, and an analysis shows the following composition: carbon 51.48%, hydrogen 6.76%, nitrogen 18.14%, sulphur .96%, oxygen 22.66%. The material is high in carbon, but yet it does not readily burn. The powdered scale can be used over and over again until the carbon content is substantially exhausted, which is a decided advantage, as far as cost and convenience are concerned.

On account of its peculiar composition, the scale possesses the property of giving up its carbon to metals more readily than bone compound, and the metal absorbs it evenly. Consequently, a very uniform hardening is obtained. I have found that the same depth of carburizing can be obtained in much less time with my improved material as can be obtained with the bone composition of commerce.

While it is preferable to grind the fish scales before use as a carburizing material, I may, nevertheless, use the scales directly, especially the smaller ones, such as those obtained from sardines and salmon.

Having described my invention, what I claim is:

1. The process of carburizing metals, which consists in heating them in fish scale material and causing the metals to absorb carbon.

2. The process of hardening metals, which consists in heating said metals in fish scale material until the desired amount of carbon is absorbed and then quenching to suddenly lower the temperature.

3. The process of hardening metals, which consists in heating said metals in powdered fish scale until the desired amount of carbon is absorbed and then quenching to suddenly lower the temperature.

4. The process of hardening metals, which consists in placing the metal in intimate contact with a powdered material containing a high percentage of icthylepidin, heating the metal and powdered material together until the powdered icthylepidin material releases carbon which is absorbed by the metal with which it is in contact, and then suddenly quenching the metal to suddenly lower its temperature.

In witness whereof I have hereunto signed my name this 11 day of June, 1919.

NIELS D. NIELSEN.